United States Patent [19]
Current et al.

[11] Patent Number: 5,837,779
[45] Date of Patent: Nov. 17, 1998

[54] PROCESS FOR PRODUCING IONOMERS EMPLOYING ETHYLENE TERPOLYMERS

[75] Inventors: Steven P. Current, Novato, Calif.; Leslie P. Theard, Houston, Tex.

[73] Assignee: Chevron Chemical Company, San Ramon, Calif.

[21] Appl. No.: 645,157

[22] Filed: May 13, 1996

Related U.S. Application Data

[63] Continuation of Ser. No. 274,446, Jul. 13, 1994, abandoned.

[51] Int. Cl.⁶ ........................................................ C08F 8/42
[52] U.S. Cl. ...................... 525/369; 525/330.2; 525/367; 525/368
[58] Field of Search ..................................... 525/369, 367, 525/368

[56] References Cited

U.S. PATENT DOCUMENTS

| | | | |
|---|---|---|---|
| 2,754,280 | 7/1956 | Brown et al. | 525/369 |
| 3,753,965 | 8/1973 | Looney et al. | 525/369 |
| 4,690,981 | 9/1987 | Statz . | |
| 4,990,574 | 2/1991 | Yamada | 525/369 |
| 5,320,905 | 6/1994 | Vaughn et al. | 525/360 |
| 5,387,635 | 2/1995 | Rowland et al. | 524/379 |

*Primary Examiner*—Bernard Lipman
*Attorney, Agent, or Firm*—Marianne H. Michel

[57] ABSTRACT

A process for the production of an ionomers containing ethylenically-unsaturated structural units comprising contacting:

(a) a terpolymer containing structural units produced from (i) at least one α-olefin having from 2 to 8 carbon atoms; (ii) at least one ester of alpha, beta-ethylenically-unsaturated carboxylic acids; and (iii) at least one carboxylic acid with;

(b) an inorganic metal-containing base under conditions effective to convert at least a portion of acid functionalities to inorganic metal salts thereof.

14 Claims, No Drawings

PROCESS FOR PRODUCING IONOMERS EMPLOYING ETHYLENE TERPOLYMERS

This application is a continuation, of application Ser. No. 08/274,446, filed Jul. 13, 1994, now abandoned.

BACKGROUND OF THE INVENTION

The present invention relates to a process for the production of ionomers from ethylene terpolymers and in particular ethylene-alkyl acrylate-acrylic acid terpolymers.

Ionomers of ethylene polymers, and in particular, ethylene-alkyl (meth)acrylate copolymers are recognized in the art. Such ionomers can be employed within a variety of environments. For example, they can be employed in place of traditional polyolefins within adhesive combinations such as hot melt adhesive combinations. Furthermore, such ionomers can be particularly useful in multilayer films as seal layers.

Moreover, certain techniques are recognized in the art for producing such ionomers.

For example, U.S. Pat. No. 3,970,626 to Hurst et al relates to a batch process for the production of ionomers. In particular, this process relates to the caustic hydrolysis of ethylene-(meth)acrylate copolymers using an excess of sodium hydroxide in an aqueous solution. However, such processes typically require long residence times, i.e., on the order of several hours, and yield a product in a form which requires further processing, i.e., an emulsion rather than a solid polymer. Alternatively, U.S. Pat. No. 5,218,057 to Kurkov et al discloses a continuous process for the production of such ionomers within a reaction vessel, e.g., a reactive extruder. In particular, this method involves the saponification of ethylene-alkyl (meth)acrylate copolymers such as EMAC® (an ethylene methacrylate copolymer product of Chevron Chemical Co.) with an aqueous solution of an alkali metal base under saponification reaction conditions within a reactive extruder.

Despite the effectiveness of such processes in providing the desired ionomer, they involve the use of relatively severe conditions, e.g., high temperatures, which are not altogether desirable. Thus, it would be advantageous to be able to provide a process for production of ionomers which does not involve the use of, e.g., excessively high reaction temperatures.

This and further advantages of the inventive process will become apparent from the specification and claims which follow.

SUMMARY OF THE INVENTION

Among other factors, the present invention is based on the ability to produce ionomers from an ethylene terpolymer by neutralization of at least a portion of the acidic components of the terpolymer with a metal-containing solution such as an alkali metal base.

In particular, this process comprises contacting: (a) a terpolymer containing structural units produced from (i) α-olefins having from 2 to 8 carbon atoms; (ii) esters of alpha, beta-ethylenically-unsaturated carboxylic acids; and (iii) carboxylic acids with (b) an inorganic metal-containing base under conditions effective to convert at least a portion of the acid functionality to inorganic metal salts thereof.

In another aspect, the present invention relates to ionomers produced by the inventive process.

DETAILED DESCRIPTION OF THE PREFERRED EMBODIMENTS

As discussed above, the present invention relates to a process for the neutralization of an ethylene terpolymer so as to produce an ionomer thereof.

Within the present specification, in order to simplify terminology, the term "terpolymer" can include three or more monomer constituents as well as substituted derivatives thereof. Moreover, the term "terpolymer" as used herein is intended to refer to true interpolymers of ethylene and the other monomers, as well as blends of copolymers of ethylene and acid monomers, e.g., acrylic acid with copolymers of ethylene and ester monomers, e.g., acrylates. Furthermore, although the preferred embodiments discuss "ethylene" terpolymers, as will be seen, the present invention also encompasses the use of polymers produced from other α-olefins.

In particular, the terpolymers of the present invention include structural units produced from:

(i) alpha-olefins having from 2 to 8 carbon atoms,
(ii) esters of alpha, beta-ethylenically-unsaturated carboxylic acids, and,
(iii) carboxylic acids.

Monomer (i) includes alpha-olefins having from 2 to 8 carbon atoms. Preferably monomer (i) comprises alpha-olefins having from 2 to 3 carbon atoms, and more preferably, monomer (i) is ethylene.

Monomer (ii) comprises esters of $\alpha,\beta$-ethylenically-unsaturated carboxylic acids, preferably having from 4 to 22 carbon atoms. More preferably, monomer (ii) has from 4 to 13 carbon atoms, and still more preferably has from 4 to 8 carbon atoms. Examples of monomer (ii) include methyl acrylate, methyl methacrylate, ethyl acrylate, ethyl methacrylate, butyl acrylate, and butyl methacrylate. Methyl acrylate is the preferred monomer (ii).

Monomer (iii) can comprise any carboxylic acid and is preferably an $\alpha,\beta$-ethylenically unsaturated carboxylic acid such as those discussed above with respect to the esters of monomer (ii). Specific examples of preferred carboxylic acids include acrylic acid and methacrylic acid.

Moreover, it is preferred that the combined ester and acid content in the terpolymer is in the range of 5 to 25% by weight and more preferably in the range of 10 to 20% by weight.

Examples of suitable terpolymers include terpolymers comprising from about 70 to 95% by weight of polymerized ethylene from about 2.5 to about 27.5% by weight polymerized $C_1$ to $C_{19}$, preferably, $C_1$ to $C_5$, alkyl acrylate or methacrylate and about 2.5 to 27.5% by weight of polymerized acrylic acid or methacrylic acid.

Exemplary terpolymers include ethylene-methyl acrylate-acrylic acid terpolymers, ethylene-methyl methacrylate-acrylic acid terpolymers, ethylene-methyl acrylate-methacrylic acid terpolymers, ethylene-ethyl acrylate-acrylic acid terpolymers, and ethylene-propylene-methyl acrylate-acrylic acid terpolymer. Ethylene-methyl acrylate-acrylic acid terpolymers are preferred.

The ethylene polymers may comprise a wide range of melt indices generally between about 0.1 and 1000, more preferably about 1 to about 500 and still more preferably about 2.5 to about 10 g/10 min.

The ethylene terpolymers employed within the present invention may be produced by a technique recognized within the art, for example, free radical initiated processes such as those described within U.S. Pat. No. 3,350,372 which is incorporated herein by reference in its entirety for all purposes. Typically, such processes involve introducing ethylene, the ester, e.g., methyl acrylate, and the carboxylic acid into a high pressure reactor along with any one of a number of recognized free radical polymerization initiators, i.e., catalysts, suitable for producing the desired polymer.

The process of the present invention comprises a neutralization of the terpolymer with an inorganic metal-containing base so as to convert at least a portion of the acid structural units to an inorganic metal salt thereof.

The inorganic metal-containing base comprises a metal present in a solvent. The metal can comprise any metal which is capable of being effectively employed in a neutralization reaction so as to convert at least a portion of the acid functionality to a metal salt thereof. Suitable metals include Group IA metals, Group IIA metals, and transition metals. Specific examples of suitable metals include lithium, sodium, potassium, rubidium, cesium, calcium, magnesium, zinc, titanium, cobalt, nickel, and copper.

Moreover, the solvent can be any solvent which does not prevent this neutralization reaction from occurring. One suitable solvent is water.

Preferably, the base comprises an aqueous solution of an oxide of the Group IA and/or a hydroxide of the Group IA or Group IIA metals and in particular, the Group IA metals, discussed above. Specific examples of preferred Group IA and Group IIA hydroxides include LiOH, KOH, RbOH, CsOH, $Mg(OH)_2$, $Ca(OH)_2$, $Sr(OH)_2$ and $Ba(OH)_2$ with solutions of sodium hydroxide, lithium hydroxide, and potassium hydroxide being more preferred. In one preferred embodiment, the hydroxide is present within an aqueous solution at a concentration of from about 1 to about 50 weight %, preferably, about 5 to about 20 weight %.

The neutralization reaction can occur under conditions which are effective in order to provide the conversion of at least a portion of the acid functionality to a metal salt thereof. Moreover, while the temperature should be sufficient to melt and process the terpolymer, e.g., provide effective mixing the balance of components, it can also be relatively mild, e.g., less than about 100° C.

The process of the present invention can provide for the partial neutralization of the terpolymer, i.e., only a portion of the acid structural units are neutralized. The product in such a process is a quaternary polymer having four functionalities, e.g., the ethylene, the ester, the carboxylate salt and the carboxylic acid.

Alternatively, the process of the present invention can provide for the complete neutralization, i.e., substantially all, if not all, of the acid functionalities are converted into metal salts. The product of such a process will be a terpolymer having three functionalities, i.e., the ethylene backbone, the ester, and the ionic metal-neutralized carboxylic acid.

The process of the present invention can occur under batch or continuous reaction environments in any suitable reactor vessel. Typical batch reactors include autoclaves while typical continuous reactors include at least one extruding vessel, e.g., at least one reactive extruder. Preferably, the reaction is preformed continuously in a reactive extruder.

A reactive extruder which is useful in producing compositions of this invention comprises an extruder having a terpolymer feed section, one or more reaction sections, a subsequent devolatilization section, and an extrusion section. Typically, these sections are separately jacketed to allow for heating or cooling within each section. These sections can also be vented with one or more vent ports per section to allow the escape of volatile components. Generally, the reactive extruder will also have optional means for introducing reactants into any reaction sections as well as means or mixing components in the reaction section (s) and means for conveying the components through the extruder. Typically, the means for mixing and conveying components to be reacted are screws.

Reactive extruders can have a single screw or multiple screws. Each screw typically has a central shaft with a key-way or spline upon which mixing elements are secured. The reactive extruder may have either co-rotating or counter-rotating screws.

One specific example of a suitable reactive extruder is a Werner and Pfleiderer corrosion resistant ZSK-40 mm twin screw extruder.

The process provides a heretofore unrecognized technique for providing a desired product in a more efficient and flexible manner.

In particular, the ionomer produced by the inventive process has a number of advantages over those produced by typical saponification reactions. For example, because such ionomers can be produced under less severe processing conditions, e.g., lower temperatures, they can be subjected to less degradation and discoloration.

Further, the process of the present invention provides not only for these improved terpolymers but is also capable of providing tetrapolymers. That is, the process is capable of providing for partial neutralization of the acid groups and therefore an ionomer which contains not only the ester groups but also the acid group, which ionomer can have enhanced processability.

Although the present invention has been described in terms of certain preferred embodiments, it is to be recognized that various modifications, substitutions and changes may be made without departing from the spirit thereof. Thus, the scope of the present invention should be determined based solely upon the following claims.

We claim:

1. A process for the production of an ionomer having enhanced processability and which is produced from ethylenically-unsaturated monomeric structural units comprising contacting:
   (a) a terpolymer containing structural units produced from
      (i) at least one α-olefin having from 2 to 8 carbon atoms; (ii) at least one ester of alpha, beta-ethylenically unsaturated carboxylic acids; and (iii) at least one carboxylic acid with;
   (b) an inorganic metal-containing base under conditions effective to form a polymer which includes an effective amount of inorganic metal salts of the acid functionalities to provide an ionomer with enhanced processability,
   with the temperature of the conditions during the contacting being sufficient to melt the terpolymer.

2. The process according to claim 1 wherein the α-olefin of (i) is ethylene.

3. The process according to claim 2 wherein the terpolymer contains in between about 70 and 95 weight percent polymerized ethylene.

4. The process according to claim 1 wherein the ester of (ii) is an alkyl acrylate and/or alkyl methacrylate.

5. The method according to claim 4 wherein the alkyl acrylate and/or methacrylate is present in an amount of about 2.5 to 27.5 weight percent of the ethylene polymer.

6. The process according to claim 1 wherein the ester of (ii) is a methyl acrylate.

7. The method according to claim 1 wherein the carboxylic acid is acrylic acid.

8. The method according to claim 1 wherein the carboxylic acid is methacrylic acid.

9. The method according to claim 1 wherein the carboxylic acid is present in an amount of about 2.5 to 27.5 weight percent of the ethylene polymer.

10. The method according to claim 1 wherein the combined amounts of (ii) and (iii) is about 5–25 weight percent of the terpolymer.

11. The method according to claim 10 wherein the combined amount is about 10 to 20 weight percent of the terpolymer.

12. The method according to claim 1 wherein the inorganic metal-containing base includes a Group IA or Group IIA metal hydroxide.

13. The method according to claim 12 wherein the inorganic metal-containing base is an aqueous solutions of sodium hydroxide, lithium hydroxide, and/or potassium hydroxide.

14. The method according to claim 1 wherein the reaction conditions comprise a temperature of less than 100° C.

* * * * *